United States Patent
Kim

(10) Patent No.: US 12,319,123 B2
(45) Date of Patent: Jun. 3, 2025

(54) SYSTEM FOR CONTROLLING DIRECT AND INDIRECT MULTIFUNCTIONAL AIR VENTS

(71) Applicant: HYUNDAI MOBIS Co., Ltd., Seoul (KR)

(72) Inventor: Seung Cheol Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 680 days.

(21) Appl. No.: 17/667,798

(22) Filed: Feb. 9, 2022

(65) Prior Publication Data
US 2022/0266655 A1    Aug. 25, 2022

(30) Foreign Application Priority Data
Feb. 9, 2021  (KR) .......... 10-2021-0018684

(51) Int. Cl.
 *B60H 1/00*  (2006.01)
 *B60H 1/34*  (2006.01)
(52) U.S. Cl.
 CPC ......... *B60H 1/00871* (2013.01); *B60H 1/008* (2013.01); *B60H 1/00971* (2013.01); *B60H 1/3421* (2013.01)
(58) Field of Classification Search
 CPC . B60H 1/00778; B60H 1/3407; B60H 1/3421
 USPC .......................................... 454/75
 See application file for complete search history.

(56) References Cited

U.S. PATENT DOCUMENTS

| | | | |
|---|---|---|---|
| 6,651,895 B1* | 11/2003 | Kadle | F24F 11/30 454/258 |
| 10,752,082 B1 | 8/2020 | Kearney et al. | |
| 11,535,081 B1* | 12/2022 | Kearney | B60H 1/00685 |
| 2009/0247063 A1* | 10/2009 | Vollertsen | B60H 1/00828 454/143 |
| 2010/0265046 A1* | 10/2010 | Lin | B60H 1/00742 340/425.5 |

(Continued)

FOREIGN PATENT DOCUMENTS

| | | | |
|---|---|---|---|
| CN | 109237749 A | 1/2019 | |
| CN | 114074530 A * | 2/2022 | ......... B60H 1/00028 |
| DE | 3717676 A1 | 12/1988 | |

(Continued)

OTHER PUBLICATIONS

Office Action issued in corresponding Chinese Patent Application No. 202210121610.1 dated Mar. 26, 2025, with English translation.

*Primary Examiner* — Allen R. B. Schult
*Assistant Examiner* — William C Weinert
(74) *Attorney, Agent, or Firm* — MORGAN, LEWIS & BOCKIUS LLP

(57) ABSTRACT

Disclosed herein is a system for controlling direct and indirect multifunctional air vents, which includes an air vent mounted inside a dashboard in an interior of a vehicle, and configured to guide air flowing from a vehicle air conditioner to the interior of the vehicle while switching to a direct wind mode or an indirect wind mode, a mode input module provided outside the vehicle such that a user selects one of the direct wind mode and the indirect wind mode, and a controller configured to control the air vent to switch the mode of the air vent in response to the mode selected by the user through the mode input module.

10 Claims, 19 Drawing Sheets

(56) References Cited

U.S. PATENT DOCUMENTS

2017/0368908 A1* 12/2017 Cervantes .......... B60H 1/00778
2021/0347216 A1* 11/2021 Robertson ............. B60D 1/145

FOREIGN PATENT DOCUMENTS

| DE | 602005000821 T2 | | 8/2007 | |
|---|---|---|---|---|
| ES | 2657916 T3 | * | 3/2018 | ............. B60H 1/008 |
| JP | 2008-265445 A | | 11/2008 | |

* cited by examiner

SYSTEM FOR CONTROLLING DIRECT AND INDIRECT MULTIFUNCTIONAL AIR VENTS

CROSS REFERENCE TO RELATED APPLICATION(S)

This application claims the benefit of priority to Korean Patent Application No. 10-2021-0018684 filed on Feb. 9, 2021 in the Korean Intellectual Property Office, the entire contents of which is hereby incorporated by reference.

BACKGROUND

1. Technical Field

The present disclosure relates to a system for controlling an air vent installed at the end of a vehicle air conditioner.

2. Related Art

Most of the wing-type air vents used currently are implemented in a way that a user controls a wind direction from a wing by operating a knob.

However, these wing-type air vents in which the user manually controls the wind direction often cause inconvenience since the wind directly touches the user's body.

In order to solve this structural issue and utilize a next-generation slim cockpit design at the same time, various attempts have been made in consideration of design and function in recent vehicle markets, but there is still a long way to go in terms of effectiveness.

SUMMARY

Various embodiments are directed to a system for controlling direct and indirect multifunctional air vents, which is capable of adapting direct and indirect wind modes of a multifunctional air vent to suit a vehicle environment.

Various embodiments are also directed to a vehicle air vent having direct and indirect wind functions, which is applicable to a next-generation slim cockpit design.

The present disclosure is not limited to the above-mentioned objects, and other objects of the present disclosure can be clearly understood by those skilled in the art to which the present disclosure pertains from the following description.

In accordance with an aspect of the present disclosure, there is provided a system for controlling direct and indirect multifunctional air vents, which includes an air vent mounted inside a dashboard in an interior of a vehicle, and configured to guide air flowing from a vehicle air conditioner to the interior of the vehicle while switching to a direct wind mode or an indirect wind mode, a vehicle state detector configured to detect a vehicle state for changing the mode of the air vent, and a controller configured to control the air vent to change the mode thereof in response to the vehicle state detected by the vehicle state detector.

In accordance with another aspect of the present disclosure, there is provided a system for controlling direct and indirect multifunctional air vents, which includes an air vent mounted inside a dashboard in an interior of a vehicle, and configured to guide air flowing from a vehicle air conditioner to the interior of the vehicle while switching to a direct wind mode or an indirect wind mode, a mode input module provided outside the vehicle such that a user selects one of the direct wind mode and the indirect wind mode, and a controller configured to control the air vent to switch the mode of the air vent in response to the mode selected by the user through the mode input module.

DETAILED DESCRIPTION

Advantages and features of the present disclosure and methods of achieving them will become apparent with reference to the embodiments described below in detail in conjunction with the accompanying drawings. The present disclosure may, however, be embodied in different forms, and should not be construed as being limited to the embodiments set forth herein. Rather, these embodiments are provided so that the disclosure will be thorough and complete, and will fully convey the scope of the present disclosure to those skilled in the art. The present disclosure should be defined based on the entire content set forth in the appended claims. Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises/includes" and/or "comprising/including" when used in the specification, specify the presence of stated components, steps, motions, and/or elements, but do not preclude the presence or addition of one or more other components, steps, motions, and/or elements.

Figure 1:
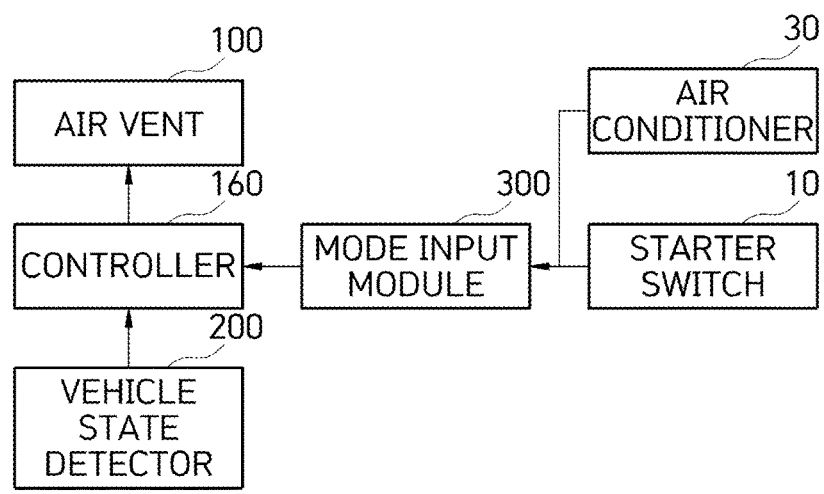
FIG. 1 is a block diagram illustrating a system for controlling direct and indirect multifunctional air vents according to an embodiment of the present disclosure.
Figure 2:
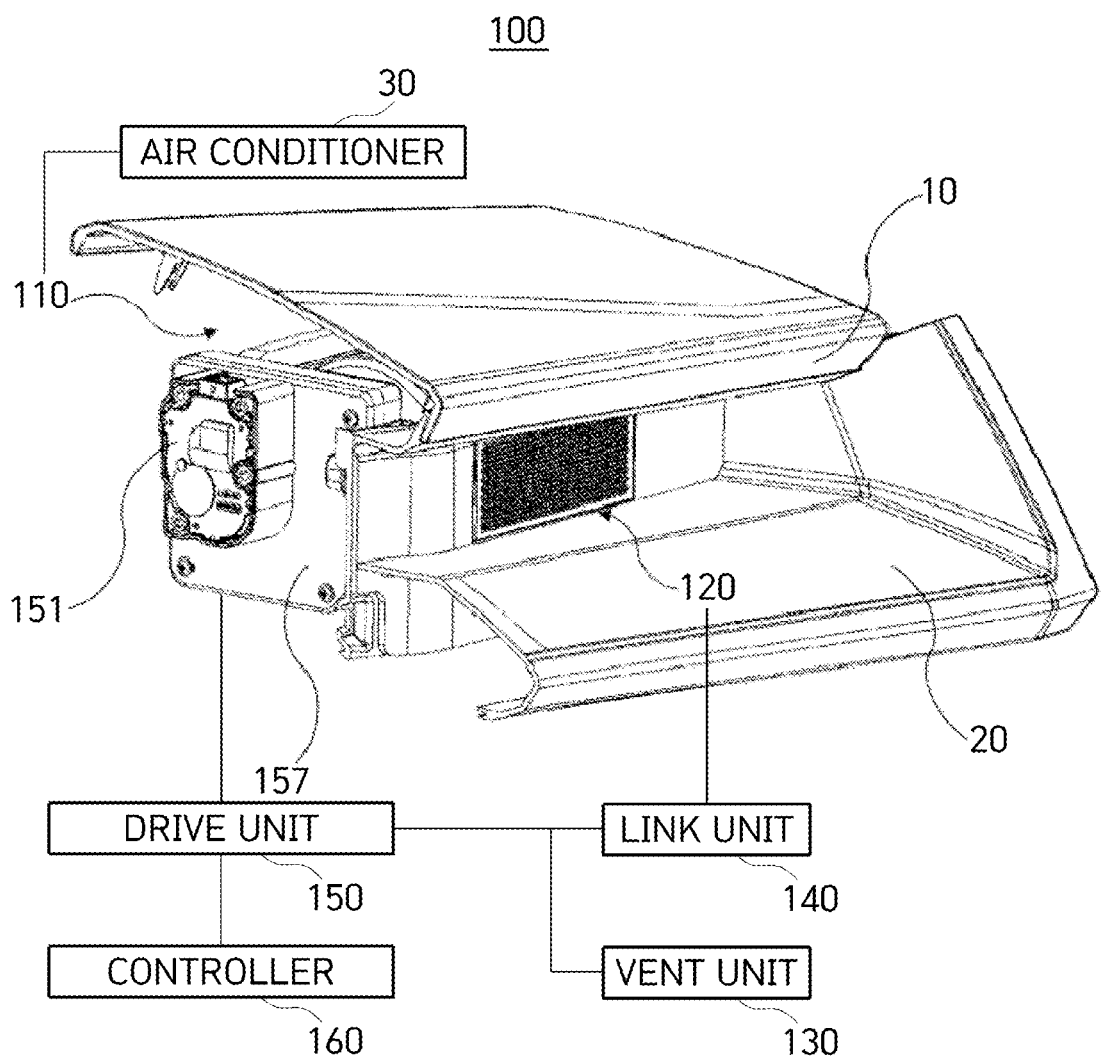
FIG. 2 is a front perspective view schematically illustrating the air vent of FIG. 1.

FIG. 1 is a block diagram illustrating a system for controlling direct and indirect multifunctional air vents according to an embodiment of the present disclosure.

As illustrated in FIG. 1, the system for controlling direct and indirect multifunctional air vents according to the embodiment of the present disclosure includes an air vent 100, a vehicle state detector 200, and a controller 160.

The air vent 100 is mounted inside a dashboard in an interior of a vehicle, and is configured to switch to a direct wind mode or an indirect wind mode under the control of the controller 160 and to guide air flowing from a vehicle air conditioner 30 to the interior of the vehicle.

The vehicle state detector 200 detects a vehicle state for changing the mode of the air vent 100. For example, The vehicle state such as whether the vehicle is started, the temperature of the vehicle, and the strength of the wind direction of the air conditioner, which are information collected through a sensor mounted on a conventional vehicle, is detected.

The controller 160 controls the air vent 100 to change the mode of the air vent in response to the vehicle state detected by the vehicle state detector 200. The controller of the vehicle may be used by an Electronic Control Unit or Micro Controller Unit.

For example, when the vehicle is stopped for parking after traveling and then turned off, the vehicle state detector 200 may detect that the vehicle is in an OFF state. It is preferable that the vehicle state detector 200 and the controller 160 operate by receiving power from a battery for a certain period of time even when the vehicle is turned off.

As such, when it is detected that the vehicle is in the OFF state, the controller 160 controls the air vent 100 to enter the indirect wind mode in which a duct unit 110 of the air vent 100 is blocked at the front thereof by a cover unit 120 so that wind is not provided directly to a user from the air conditioner 30.

In addition, the controller 160 may switch or maintain the mode of the air vent 100 after maintaining a blowing mode using the air conditioner for a preset time before it is detected that the vehicle is in the OFF state so that the mode of the air vent 100 is maintained or switched to the indirect wind mode.

As such, when it is detected that the vehicle is in the OFF state, the controller 160 may maintain the blowing mode using the air conditioner for a certain period of time (5 to 10 minutes), thereby preventing condensate from occurring within the cover unit 120 made of mesh.

When it is detected that the vehicle is in the OFF state, the controller 160 stores, in a storage unit 400, mode information before the mode of the air vent is maintained or switched to the indirect wind mode.

Accordingly, when the vehicle is restarted for driving after parking, the controller 160 may cause the vehicle state detector 200 to detect that the vehicle is switched from the OFF state to an ON state.

In this case, the controller 160 may control the air vent 100 in the air vent mode stored in the storage unit 400 to completely restore a previous setting desired by the user.

When it is detected that the vehicle is switched from the OFF state to the ON state, the controller 160 may also control the air vent 100 to enter the direct wind mode.

In order to quickly bring the vehicle interior to an appropriate temperature depending on the outside temperature, for example, in winter or summer, the mode of the air vent may be switched to the direct wind mode, in which wind is provided directly to the user from the air conditioner 30, rather than to the indirect wind mode.

Meanwhile, the controller 160 may control the mode of the air vent 100 by determining whether the air conditioner is operated while the vehicle is traveling.

If the air conditioner is in operation, the controller 160 controls the air vent 100 to operate in the direct wind mode.

On the other hand, if the air conditioner is not in operation, the controller 160 controls the air vent 100 to operate in the indirect wind mode. When the air conditioner is not in operation, controlling the air vent 100 to operate in the indirect wind mode may not provide the user with the wind supplied from the air conditioner 30, but it is possible to prevent foreign substances in the vehicle from flowing into the air conditioner.

When the mode of the air vent 100 is switched to the indirect wind mode while the air conditioner is in operation, the controller 160 determines whether the air conditioner has a wind strength equal to or greater than a preset value. The wind strength in this embodiment is at a second speed level, which refers to the wind strength that can obtain, for example a windless effect, when wind is provided from the air conditioner 30 through the cover unit 120 to the user.

Accordingly, in the embodiment of the present disclosure, even if the user sets the wind strength to be equal to or greater than a preset value in the indirect wind mode, the wind strength may be maintained without changing.

In the embodiment of the present disclosure, the controller 160 may change the mode setting of the air vent 100 depending on the temperature set through the air conditioner. It is preferable that the mode setting of the air vent 100 be automatically changed by an automatic setting button.

Accordingly, when the air conditioner is set to operate automatically based on the set temperature, the controller 160 may control the air vent 100 to operate in the direct wind mode when the temperature in the vehicle does not reach the preset temperature, whereas the controller 160 may control the air vent 100 to operate in the indirect wind mode when the temperature in the vehicle reaches the preset temperature.

When an event such as external force or foreign substance penetration is detected in switching the mode of the air vent 100, the controller 160 controls the air vent 100 to stop the mode switching operation thereof and return to the previous mode.

At the same time, the controller 160 may generate a warning sound indicating that the air vent 100 malfunctions due to the external force acting thereon, or may output a warning message to an AVN or a cluster, which is an operation system, to stop the control of the cover unit 120 and the air vent 100.

Meanwhile, the controller 160 according to the embodiment of the present disclosure may perform a function for setting an initial position of an actuator when the vehicle is started.

When it is detected that the vehicle is switched from the OFF state to the ON state, the controller 160 may control the air vent 100 so that the mode thereof is switched to the indirect wind mode, the direct wind mode, and the indirect wind mode for setting the initial position of the actuator of the air vent 100.

This is to recognize the position of the cover unit 120 of the air vent 100, and the position of the cover unit 120 may be recognized through a Hall sensor (Hall IC).

In addition, when a welcome function operation is detected before the vehicle is started, the controller 160 may control the air vent 100 to perform an operation for setting the initial position of the actuator of the air vent 100.

A system for controlling direct and indirect multifunctional air vents according to another embodiment of the present disclosure includes an air vent 100, a mode input module 300, and a controller 160.

The air vent 100 is mounted inside a dashboard in an interior of a vehicle, and is configured to switch to a direct wind mode or an indirect wind mode under the control of the controller 160 and to guide air flowing from a vehicle air conditioner 30 to the interior of the vehicle.

The mode input module 300 is provided outside the vehicle such that a user may select one of the direct wind mode and the indirect wind mode. Typically, the mode input module 300 may be provided together with an air conditioner control button or may be installed separately on a center fascia. The mode input module 300 in this embodiment includes a direct wind mode selection button and an indirect wind mode selection button, and may further include an automatic setting button to automatically switch between the direct wind mode and the indirect wind mode depending on the state of the vehicle.

The controller 160 controls the air vent 100 to switch the mode of the air vent in response to the mode selected by the user through the mode input module 300.

For example, when the user selects the direct wind mode selection button provided in the mode input module 300, the controller 160 controls the air vent 100 to enter the direct wind mode, whereas when the user selects the indirect wind mode selection button provided in the mode input module 300, the controller 160 controls the air vent 100 to enter the indirect wind mode.

As described above, according to the embodiment of the present disclosure, it is possible to change the wind mode depending on the user's preference by setting the wind mode to the direct wind mode in which wind is blown directly to the user or to the indirect wind mode in which wind is blown indirectly to the user who wants to avoid the direct wind in response to the user's selection.

Hereinafter, the air vent 100 according to the embodiment of the present disclosure will be described in detail with reference to FIGS. 2 to 5.

FIGS. 2 to 5 are views schematically illustrating the air vent 100 when viewed from different angles according to the embodiment of the present disclosure.

Referring to FIGS. 2 to 5, the vehicle air vent 100 according to the embodiment of the present disclosure is mounted inside the dashboard in the interior of the vehicle, and is configured to guide air flowing from the vehicle air conditioner 30 to the interior of the vehicle while switching to the direct wind mode or the indirect wind mode.

Here, the direct wind mode is a setting implemented so that wind is blown directly to the user, and the indirect wind mode is a setting implemented so that wind is blown indirectly to the user who wants to avoid the direct wind or a setting including a windless mode to block wind itself.

The vehicle air vent 100 largely includes a duct unit 110, a cover unit 120, a vent unit 130, a link unit 140, a drive unit 150, and a controller 160.

The duct unit 110 has an inlet and an outlet of an air passage in communication with the air conditioner 30 of the vehicle.

The cover unit 120 selectively shields the outlet of the duct unit 110. For example, in the indirect wind mode, the cover unit 120 partially shields the outlet of the duct unit 110 to guide air flowing from the air conditioner 30 to the vehicle interior. Since air does not directly touch the user's body in the indirect wind mode, the needs of the user who do not want direct wind can be satisfied.

The cover unit 120 can be implemented in a simple design in harmony with surrounding top and bottom garnishes 10 and 20.

For example, the cover unit 120 may be implemented in the form of a mesh to be described later, or may be implemented to block the front thereof for a windless mode. The cover unit 120 may be designed to harmonize with surrounding structures in any of the above-mentioned forms.

The vent unit 130 has a function of adjusting the wind direction of the air flowing into the vehicle through the outlet of the duct unit 110. The position of the vent unit 130 is changed to be directed toward the outlet of the duct unit 110 in the direct wind mode.

In this case, the vent unit 130 may be changed in position by adjustably sliding in forward and rearward longitudinal directions.

Here, the forward direction refers to a direction toward the inlet of the duct unit 110, and the rearward direction refers to a direction toward the outlet of the duct unit 110. The longitudinal direction refers to a direction of an imaginary line connecting the inlet and the outlet of the duct unit 110, and the width direction to be described later refers to a direction orthogonal to the longitudinal direction.

The vent unit 130 may include a rack 131b on the lower portion of a housing 131, which forms the body thereof, in the forward and rearward longitudinal directions. In addition, the vent unit 130 includes a plurality of left/right adjustment wings 132 arranged at intervals in the width direction on a vent hole 131a of the housing 131.

The link unit 140 connects the cover unit 120 and the drive unit 150 with a link structure. The link unit 140 will be described in detail with reference to the drawings.

The drive unit 150 may change the positions of the cover unit 120 and the vent unit 130. The drive unit 150 slides the vent unit 130 to the outlet of the duct unit 110 in the direct wind mode, and tilts the cover unit 120 to the outlet of the duct unit 110 in the indirect wind mode.

The controller 160 controls the drive unit 150 to be driven in response to a preset logic. Here, the preset logic refers to a logical operation condition consisting of the direct wind mode in which the vent unit 130 moves to the outlet of the duct unit 110 and the indirect wind mode in which the cover unit 120 moves to the outlet of the duct unit 110.

[Fastening Relationship Between Components]

Figure 6:
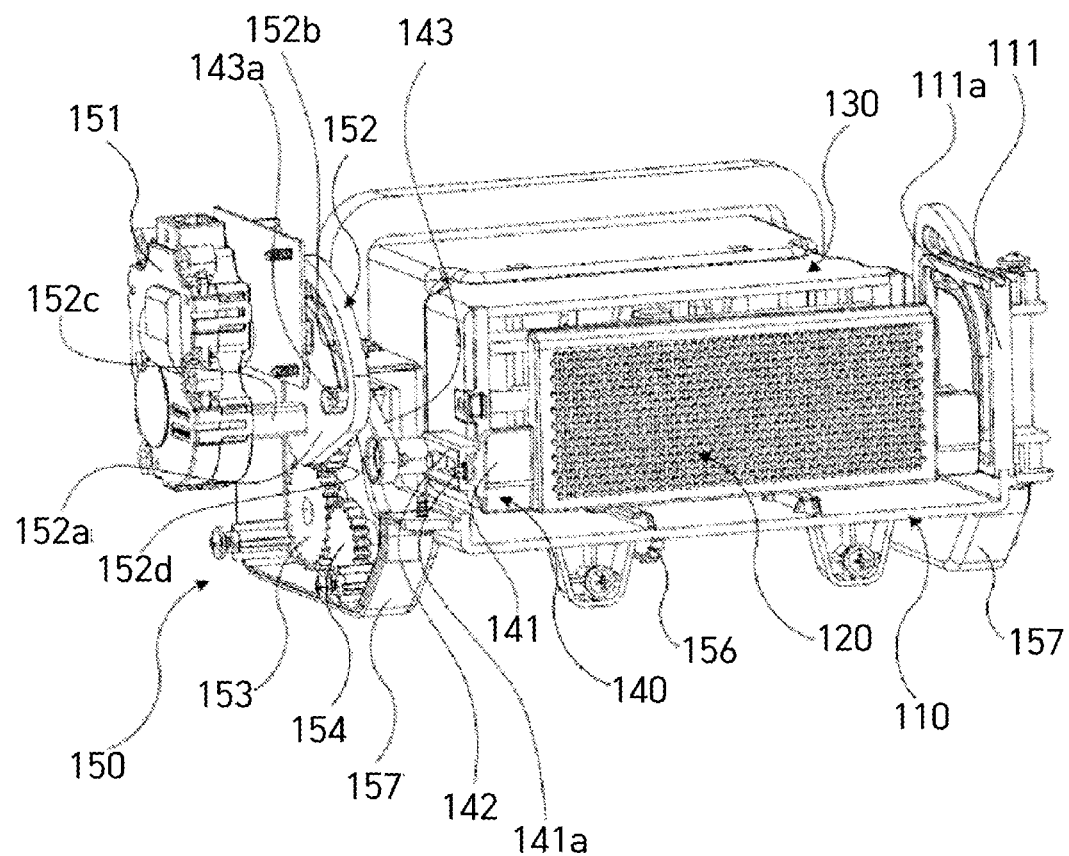
FIG. 6 is a partial front perspective view illustrating the air vent of FIG. 1 in which some components are hidden in order to explain a fastening relationship between components.
Figure 7:
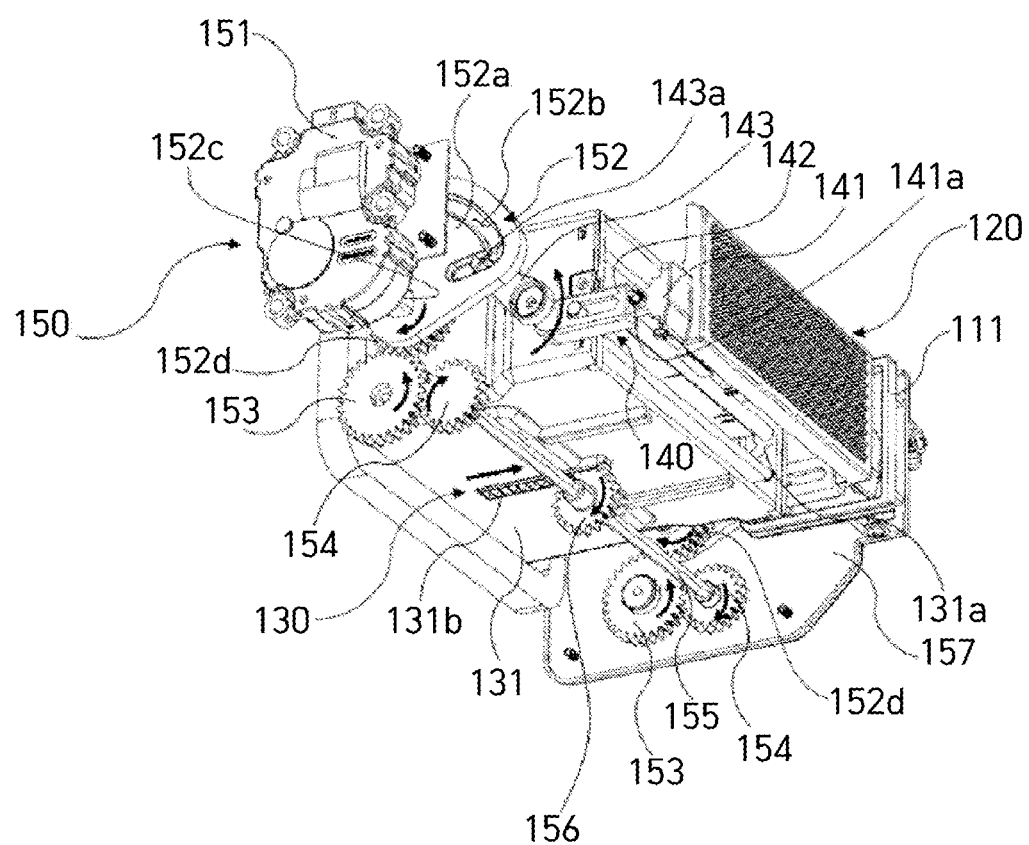
FIG. 7 is a partial bottom perspective view illustrating the air vent of FIG. 1 in which some components are hidden in order to explain a fastening relationship between components.

FIG. 6 is a partial front perspective view illustrating the vehicle air vent whose some components are hidden in order to explain a fastening relationship between components. FIG. 7 is a partial bottom perspective view illustrating the vehicle air vent whose some components are hidden.

Referring to FIGS. 6 and 7, the drive unit 150 includes an actuator 151, a main gear 152, a sub gear 153, a side gear 154, a connecting pin 155, a pinion gear 156, and a protective cover 157.

The actuator 151 is located at each of both outer ends of the duct unit 110.

The main gear 152 is positioned at each of both outer ends of the duct unit 110 together with the actuator 151 to rotate in conjunction with the rotary shaft (not shown) of the actuator 151. The main gear 152 includes a rotating cam 152a, a guide hole 152b, a camshaft 152c, and a toothed wheel 152d.

The rotating cam 152a is concentric with the rotary shaft of the actuator 151 and rotates in conjunction therewith within a preset angular range. Here, the preset angular range refers to a structural condition that does not impede mode switching in the fastening relationship between components interlocked with each other in switching the direct wind mode and the indirect wind mode.

The rotating cam 152a basically has a fan shape, and has a guide hole 152b forming an arc on the edge thereof.

The guide hole 152b may have an inverted "L"-shaped structure with one end bent.

The camshaft 152c serves as a central axis of the rotating cam 152a to connect the rotary shaft of the actuator 151 and the rotating cam 152a. The camshaft 152c may have a curved outer surface and a square cross-section, so as to be fixed without shaking with the rotating cam 152a. In addition, the camshaft 152c may be connected to cover the rotary shaft of the actuator 151 or may be connected through a separate medium. As another example, instead of the camshaft 152c, the rotary shaft of the actuator 151 may pass through the center of the rotating cam 152a.

The toothed wheel 152d has a central portion connected to the camshaft 152c and is fixedly positioned inside the rotating cam 152a. Accordingly, the toothed wheel 152d rotates in conjunction with the rotating cam 152a. The toothed wheel 152d transmits a rotational force to the sub gear 153.

The sub gear 153 rotates in engagement with the toothed wheel 152d of the main gear 152. In this case, the sub gear 153 rotates in a direction opposite to the toothed wheel 152d of the main gear 152.

The side gear 154 rotates in engagement with the sub gear 153. In this case, the side gear 154 rotates in a direction opposite to the sub gear 153.

The side gear 154 rotates in the same direction as the toothed wheel 152d.

The connecting pin 155 forms a central axis between side gears 154. In this case, the connecting pin 155 has a polygonal shape and has a curved outer surface (outer circumferential surface) connected to the side gear 154 to prevent the side gear 154 from spinning. As such, it is preferable that the central contact surface between the side gear 154 and the pinion gear 156 have a shape corresponding to the connecting pin 155.

The pinion gear 156 has a central portion connected to the connecting pin 155 to engage the rack 131b of the vent unit 130. The pinion gear 156 rotates in the same manner as the side gear 154 and may move the vent unit 130 in the forward and rearward directions.

The protective cover 157 may function to surround the components of the vent unit 130, and may have a detachable structure to facilitate internal assembly and fastening between components.

The link unit 140 interlocks the guide hole 152b of the rotating cam 152a and the cover unit 120 with a link structure. The link unit 140 may have a structure in which it is bent upward at a preset angle between the guide hole 152b and the cover unit 120. Here, the preset angle is preferably an obtuse angle.

The link unit 140 includes a cover link 141, a guide link 142, and a cam link 143.

The cover link 141 has one end fixedly connected to both ends of the cover unit 120 in the width direction thereof. The cover link 141 includes a guide protrusion 141a corresponding to a guide groove 111a in the form of an arc on the edge of a spacer 111.

The guide protrusion 141a may move on the guide groove 111a in the state in which it is fitted into the guide groove 111a of the spacer 111 during the tilting of the cover unit 120. The cover unit 120 is connected to the link unit 140 to open and close the outlet of the duct unit 110 in response to the rotation of the rotating cam.

The guide link 142 has one end fixedly connected to the other end of the cover link 141.

One end of the cam link 143 is fixedly connected to the other end of the guide link 142. The other end of the cam link 143 is connected to the rotating cam 152a.

In this case, the cam link 143 has a connecting protrusion 143a formed to movably protrude from the other end thereof so that the connecting protrusion 143a is fitted into the guide hole 152b of the rotating cam 152a. The guide link 142 and the cam link 143 are fixedly connected at an upward bent angle in a "V" form.

In addition, the cam link 143 may have an axis of rotation (not shown) to be rotatable at a designated position inside the spacer 111. Accordingly, the cam link 143 may be rotated about the axis of rotation thereof in forward and reverse directions.

Figure 8:
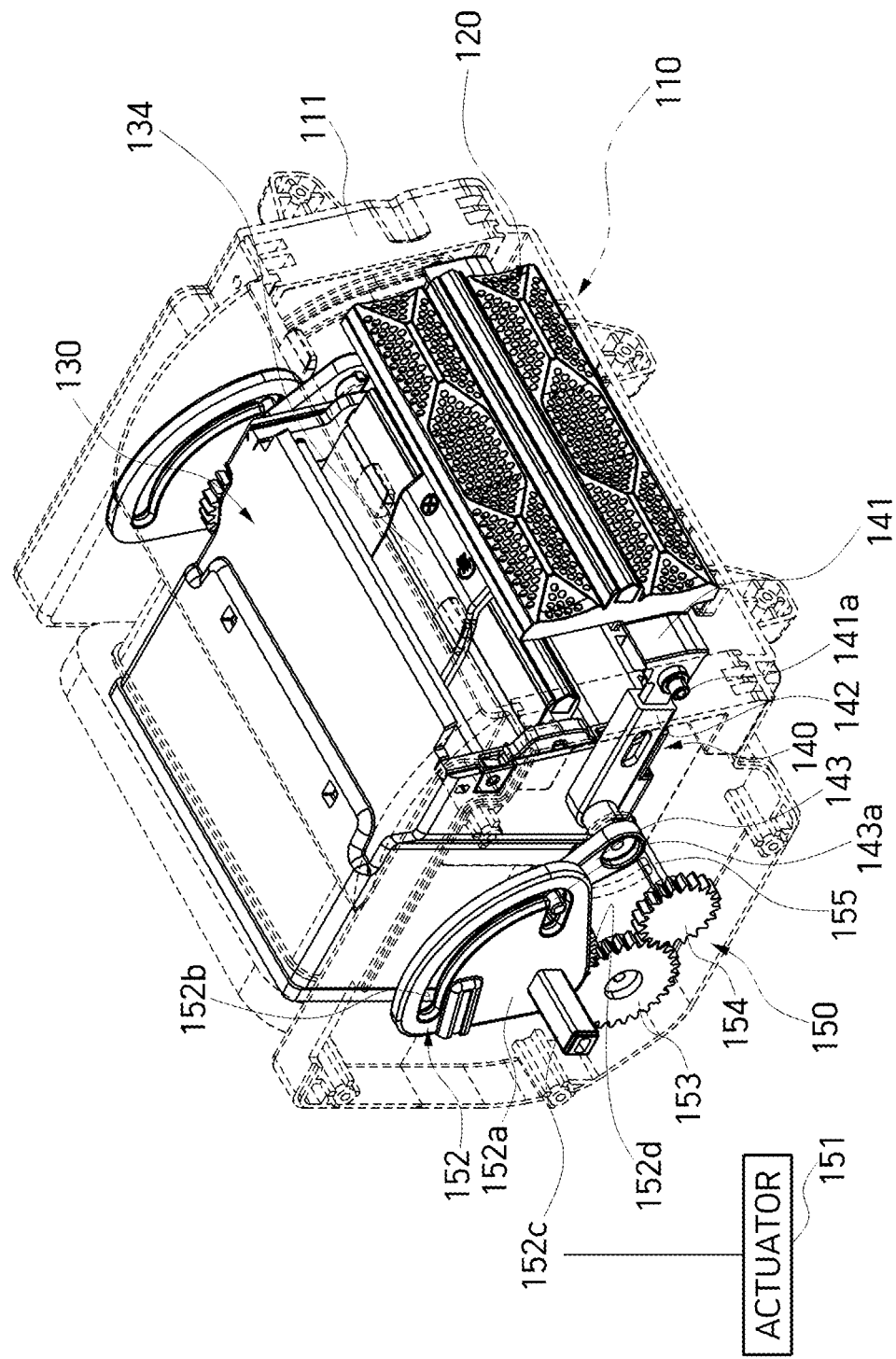
FIG. 8 is a view schematically illustrating an example in which the air vent of FIG. 1 is set in an indirect wind mode.
Figure 9:
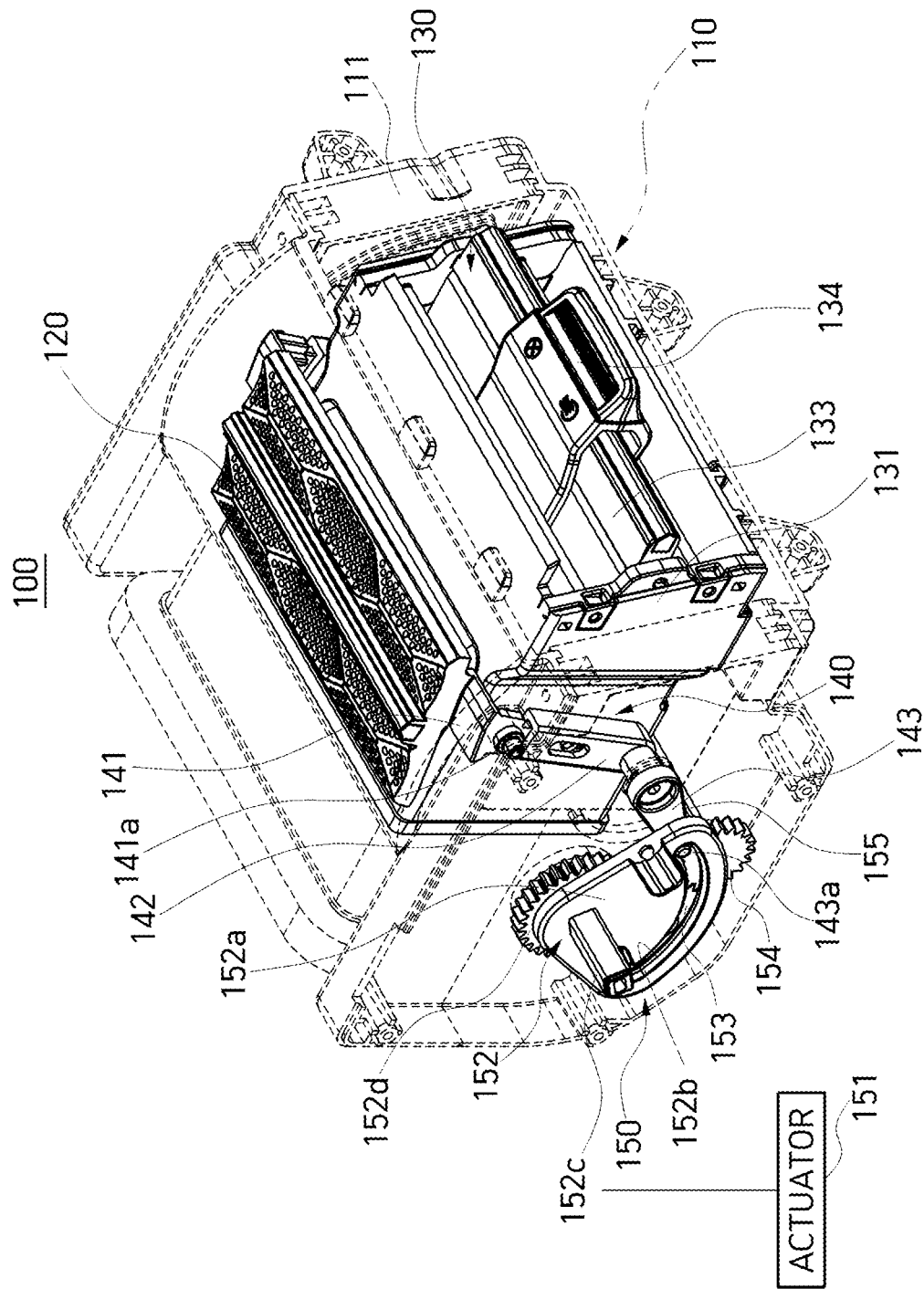
FIG. 9 is a view schematically illustrating an example in which the air vent of FIG. 1 is set in a direct wind mode.
Figure 10:
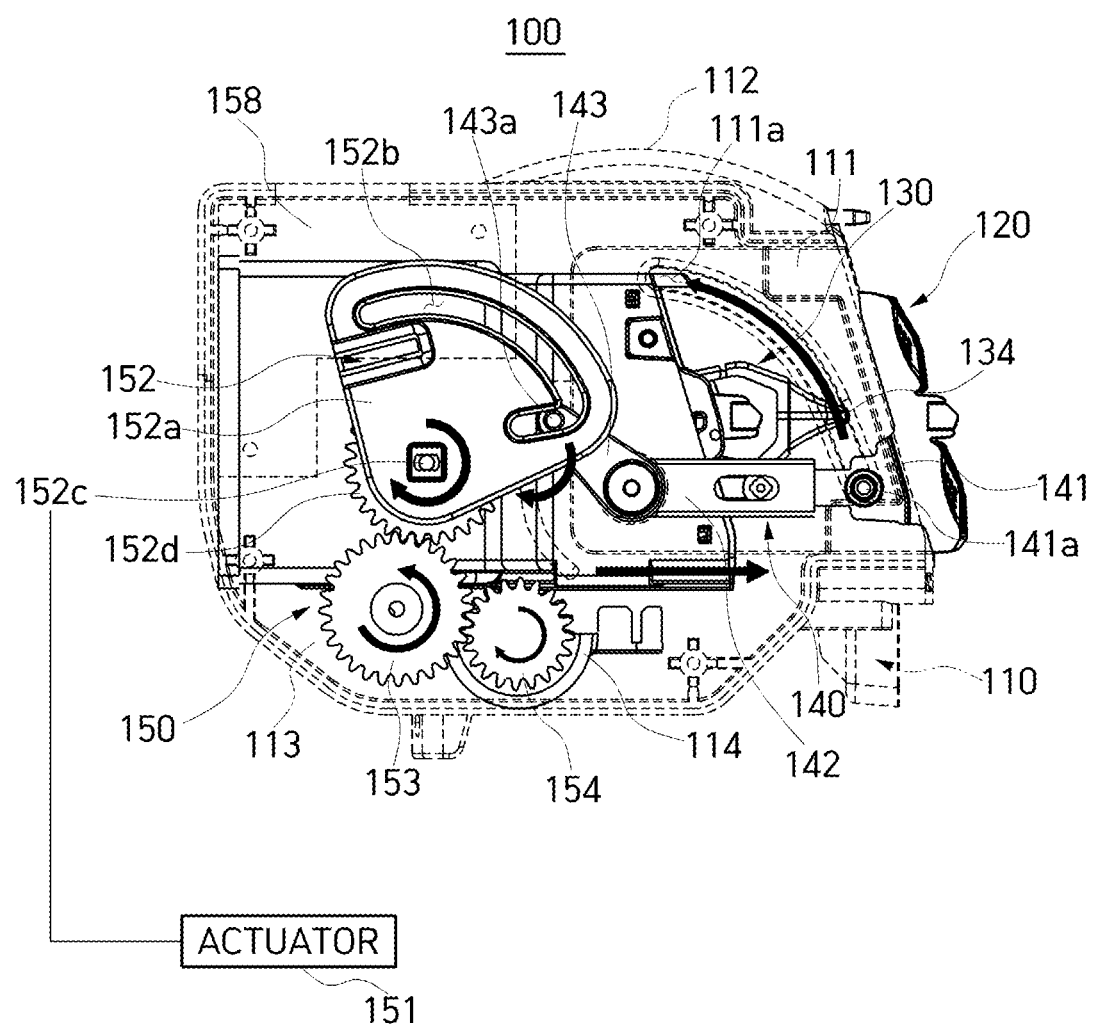
FIGS. 10 to 17 are views schematically illustrating an operating relationship between components in switching from the indirect wind mode to the direct wind mode in the air vent of FIG. 1.
Figure 11:
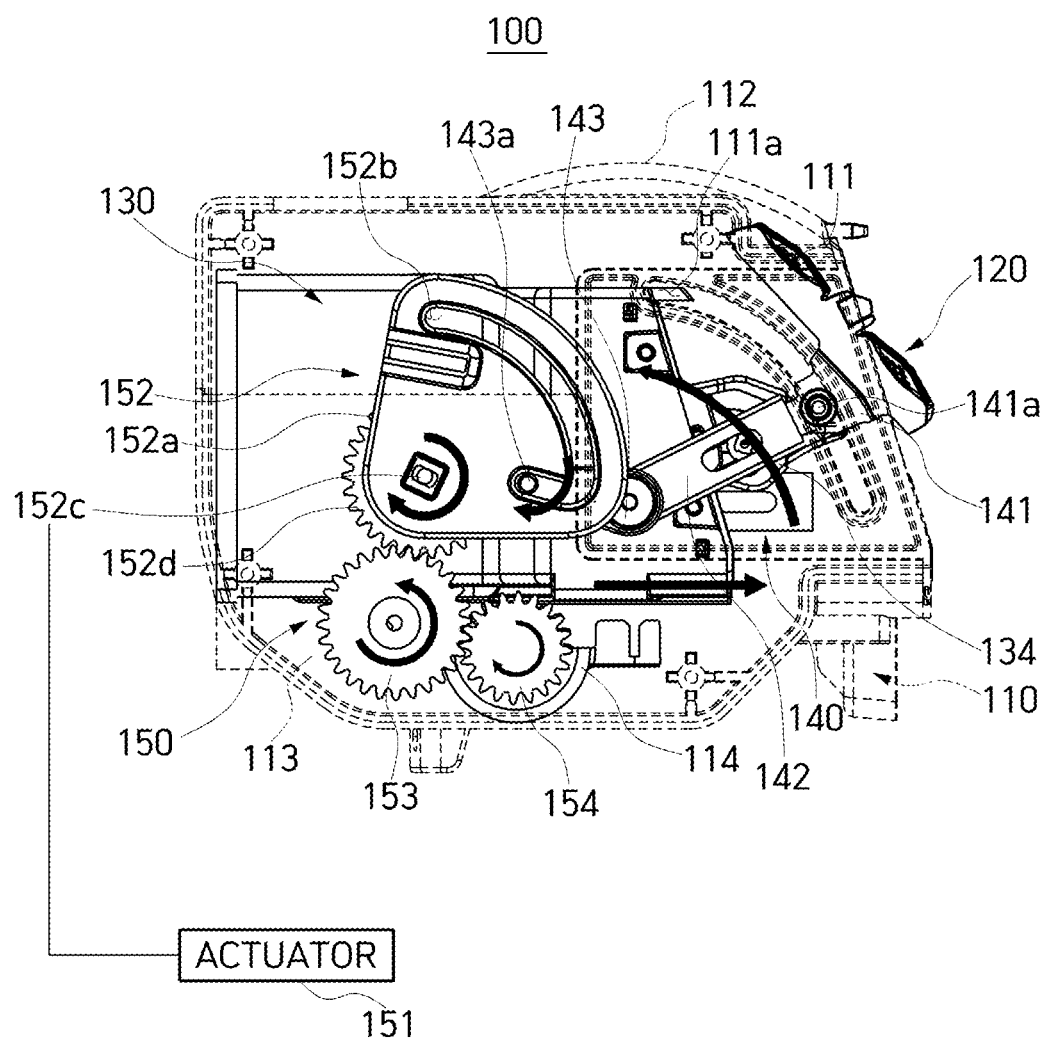
Figure 12:
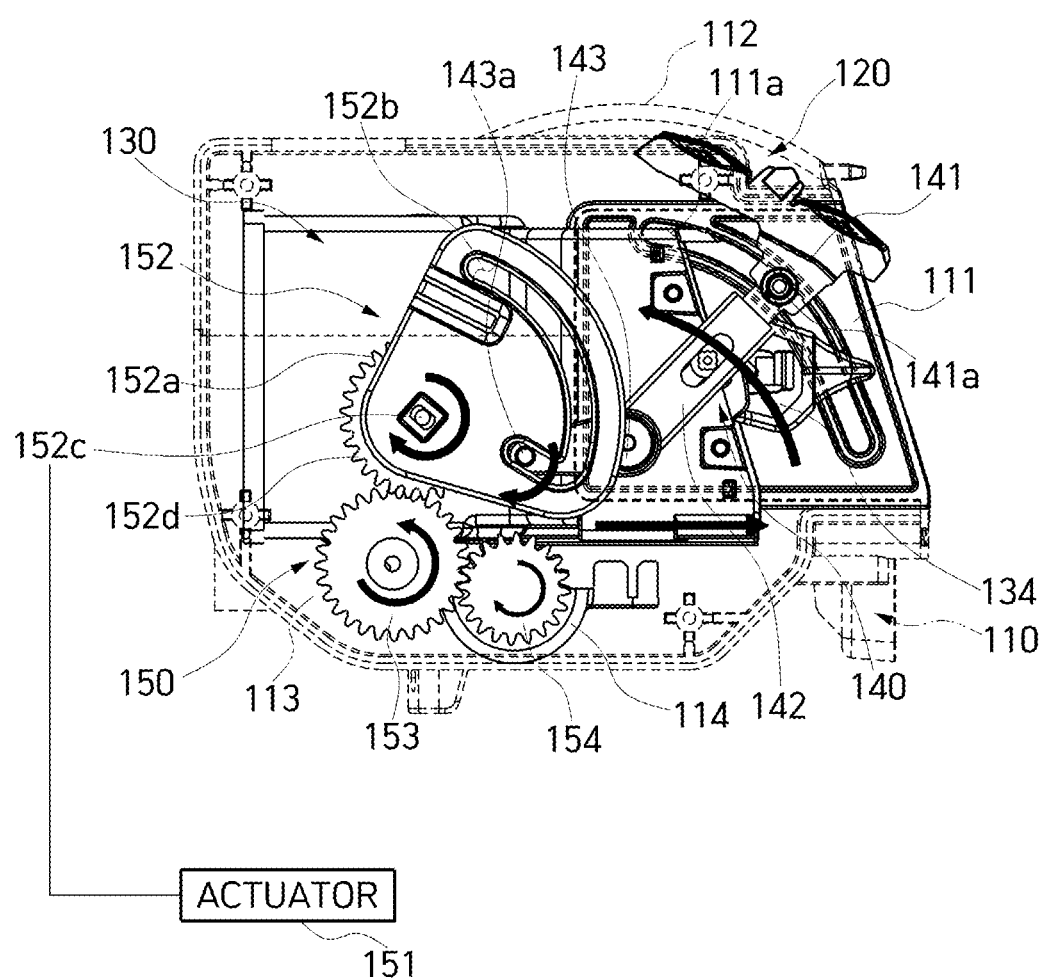
Figure 13:
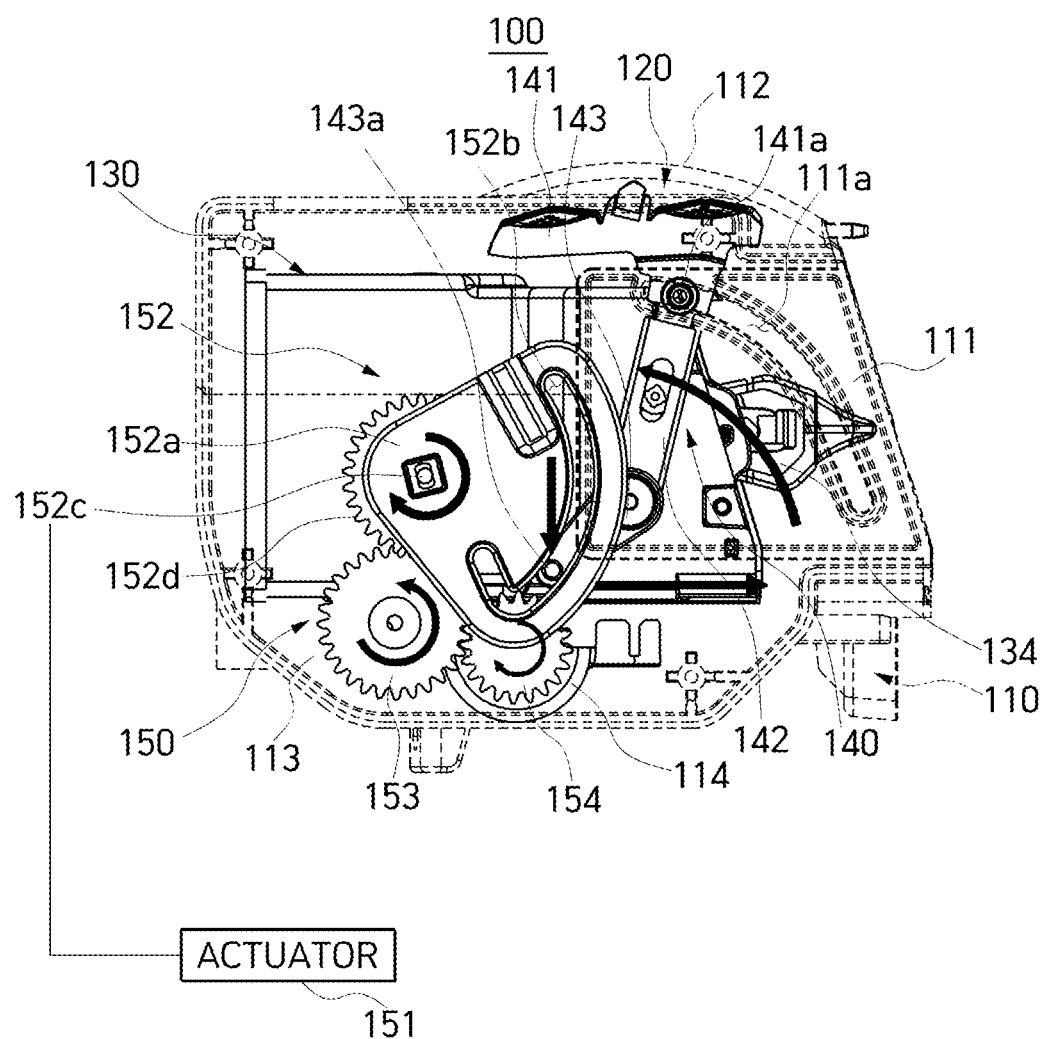
Figure 14:
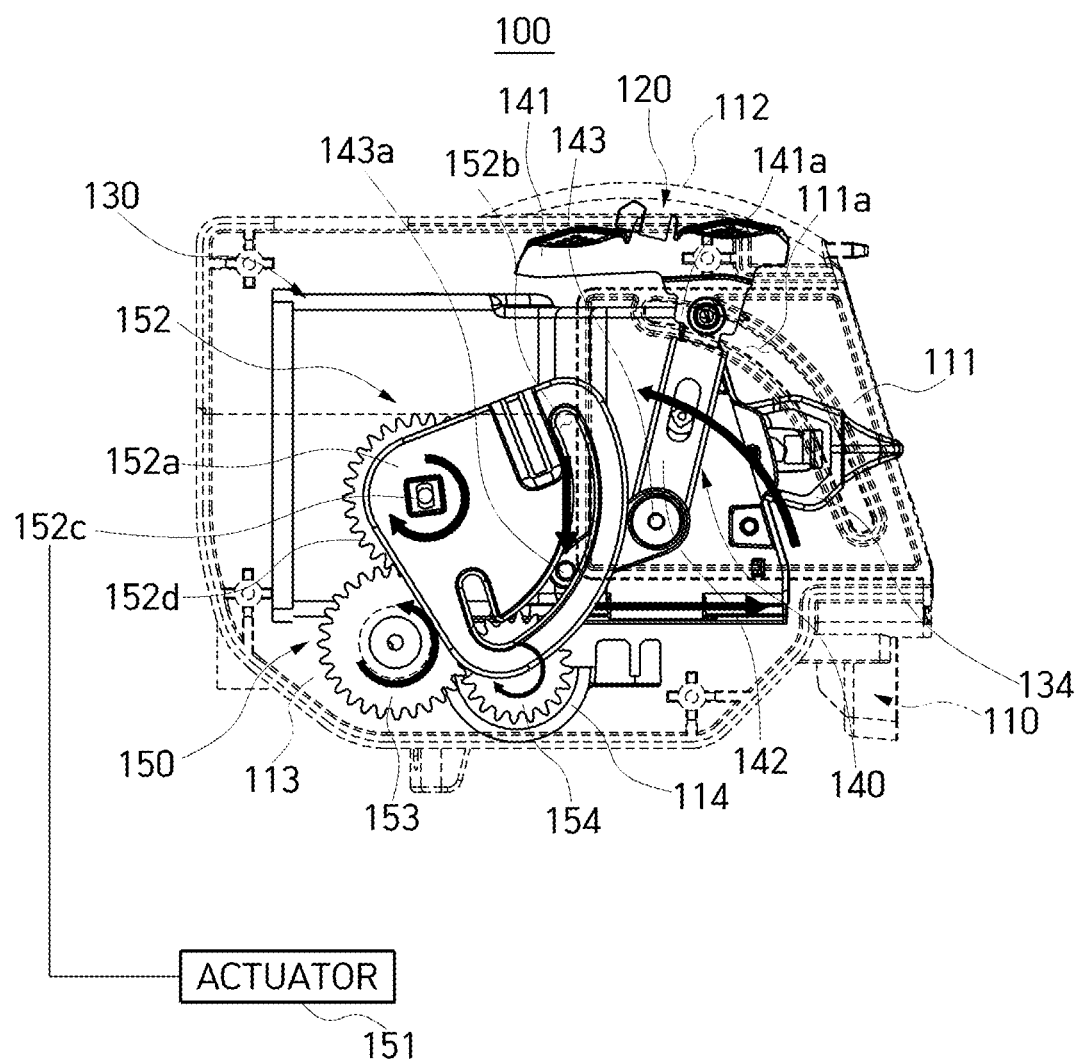
Figure 15:
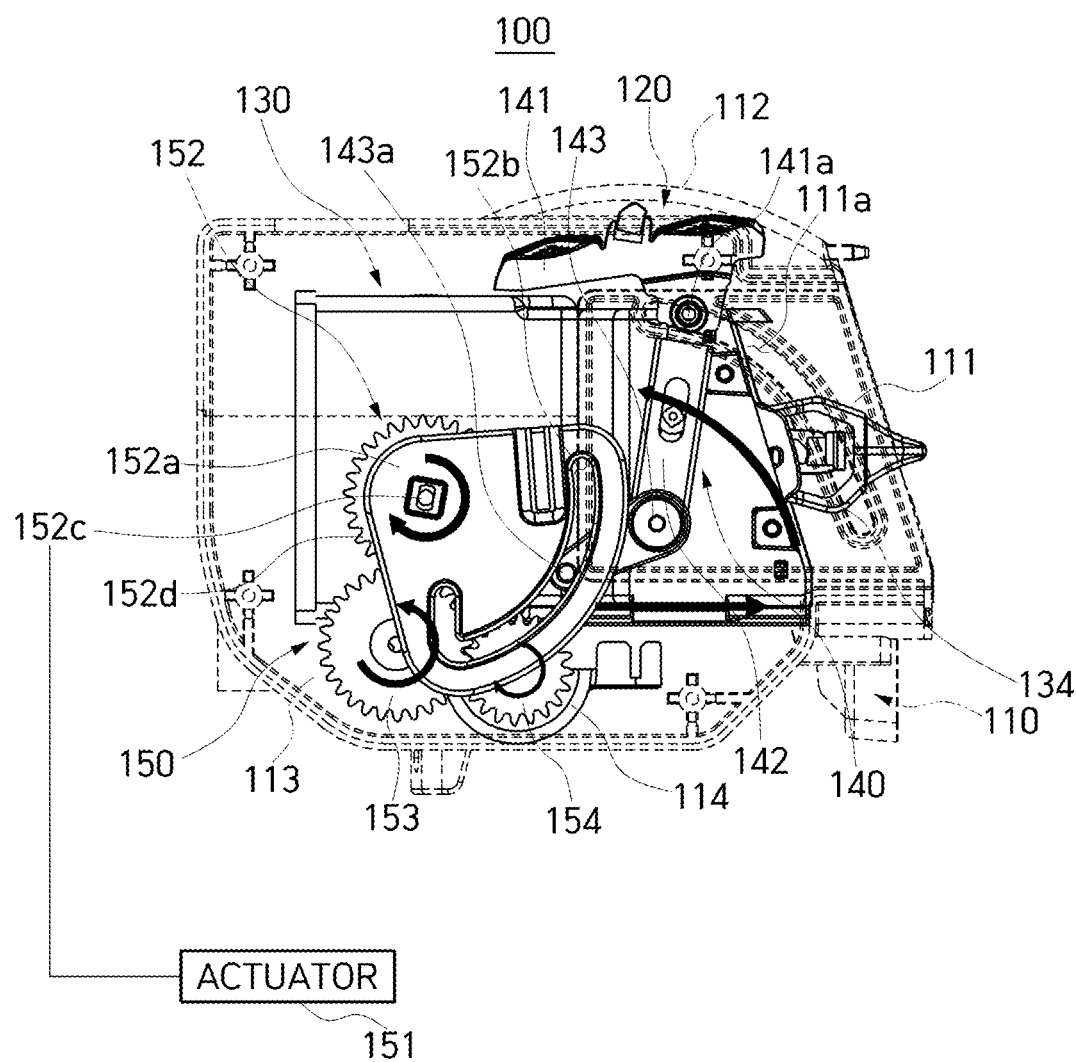
Figure 16:
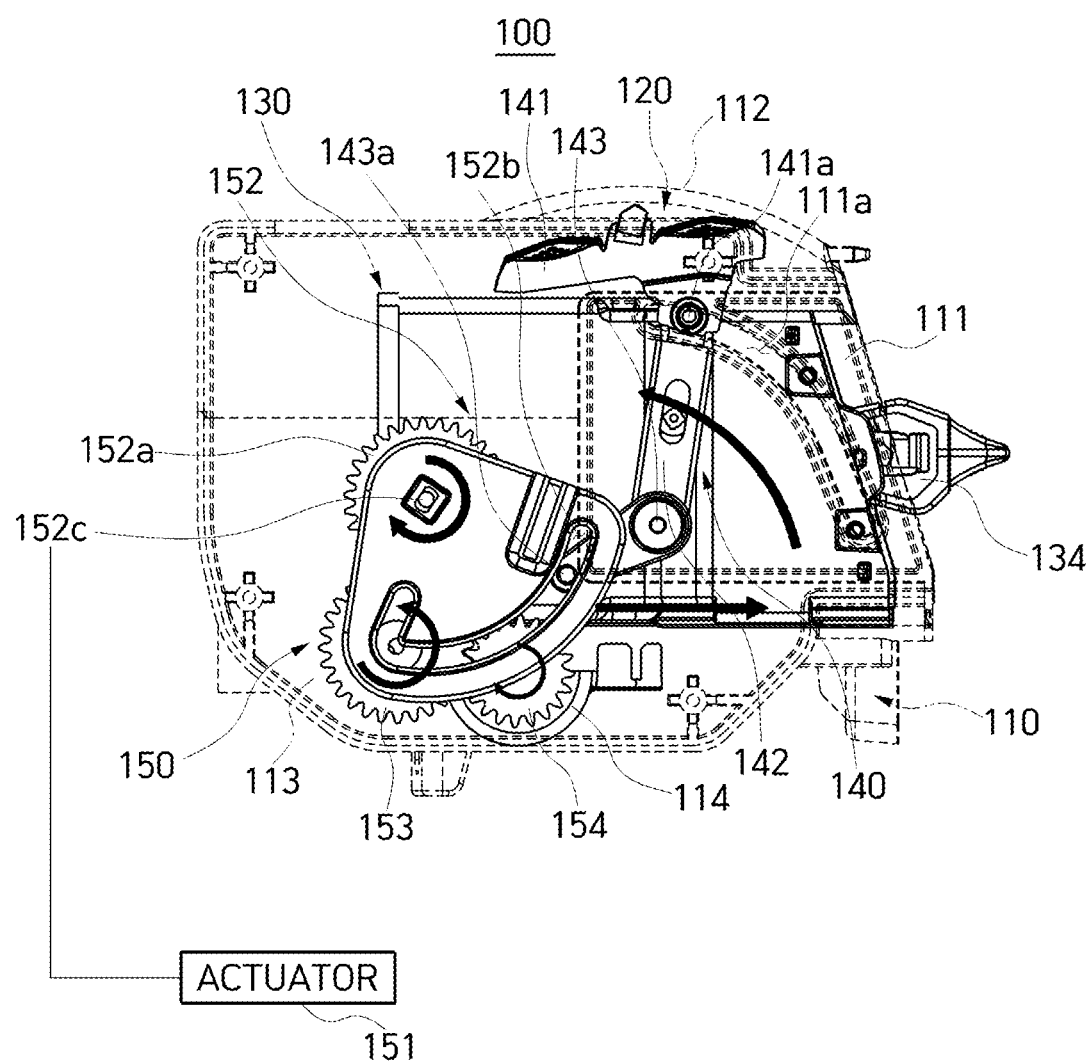
Figure 17:
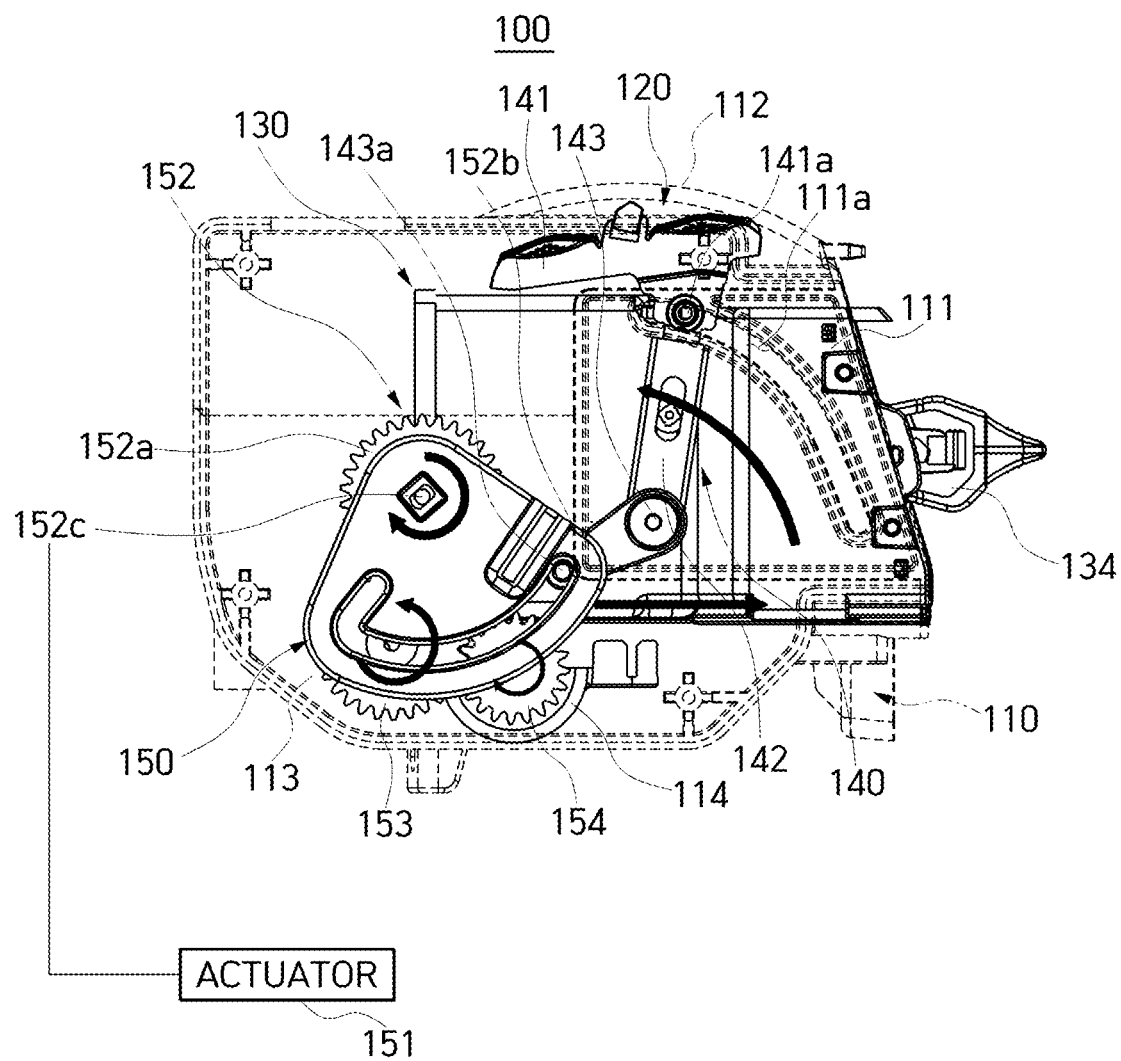

FIG. 8 is a view schematically illustrating an example in which the vehicle air vent is set in the indirect wind mode according to the embodiment of the present disclosure. FIG. 9 is a view schematically illustrating an example in which the vehicle air vent is set in the direct wind mode according to the embodiment of the present disclosure.

Referring to FIGS. 8 and 9, the vehicle air vent 100 may use the direct wind mode (manual wing type) and the indirect wind mode. The mode of the air vent may be switched to the direct wind mode is a sliding manner, and may be switched to the indirect wind mode in a tilting manner. When the user sets the indirect wind mode, as illustrated in FIG. 8, the tilted cover unit 120 is located at the outlet of the duct unit 110, and the vent unit 130 moves toward the inlet of the duct unit 110.

Figure 3:
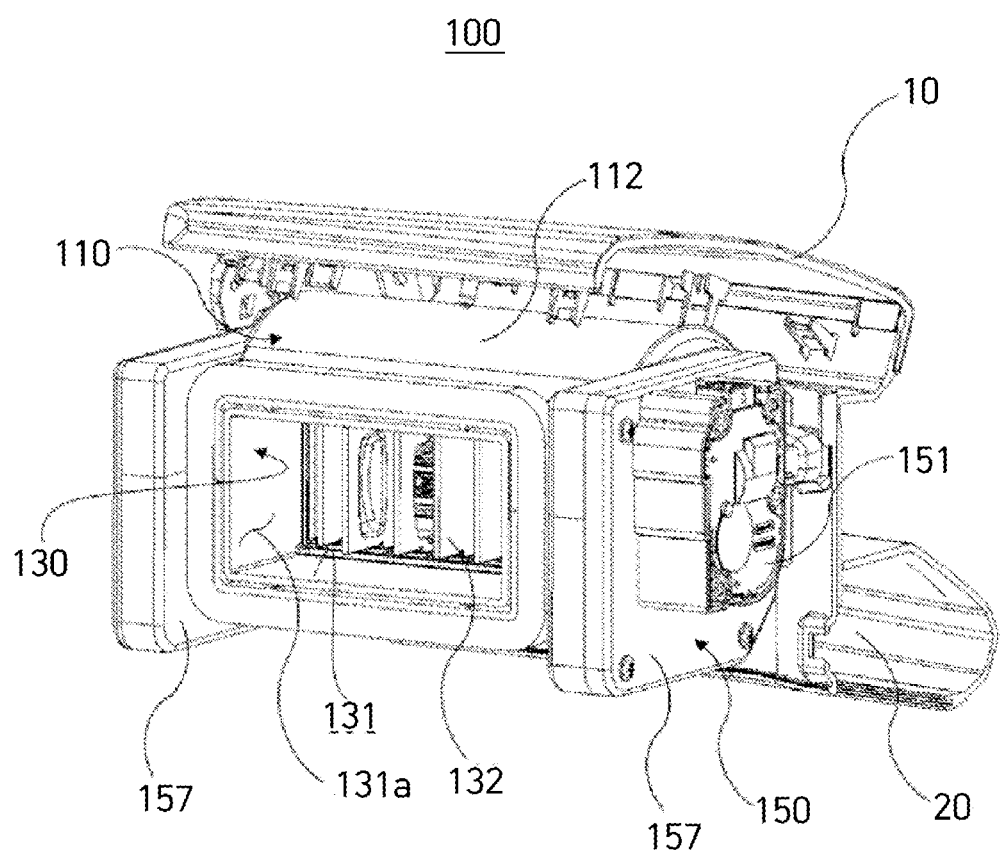
FIG. 3 is a rear perspective view schematically illustrating the air vent of FIG. 1.
Figure 4:
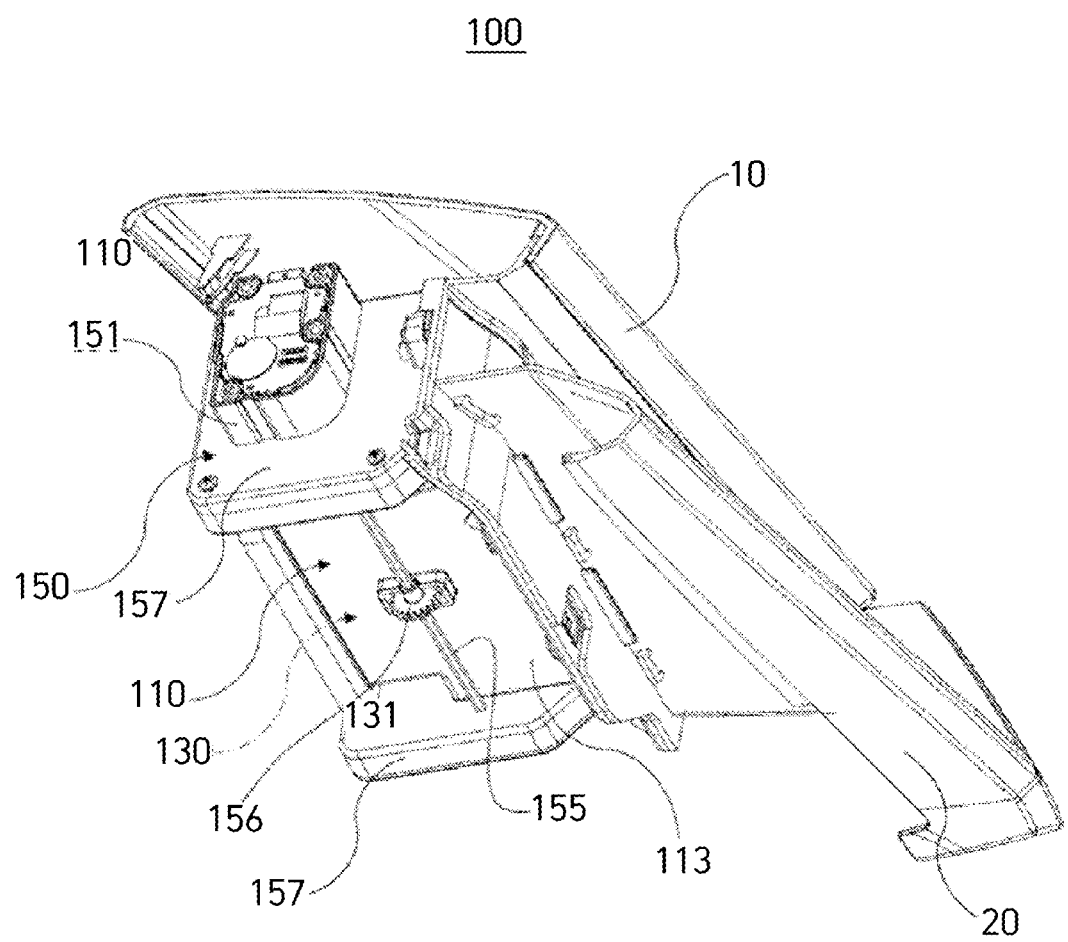
FIG. 4 is a bottom perspective view schematically illustrating the air vent of FIG. 1.
Figure 5:
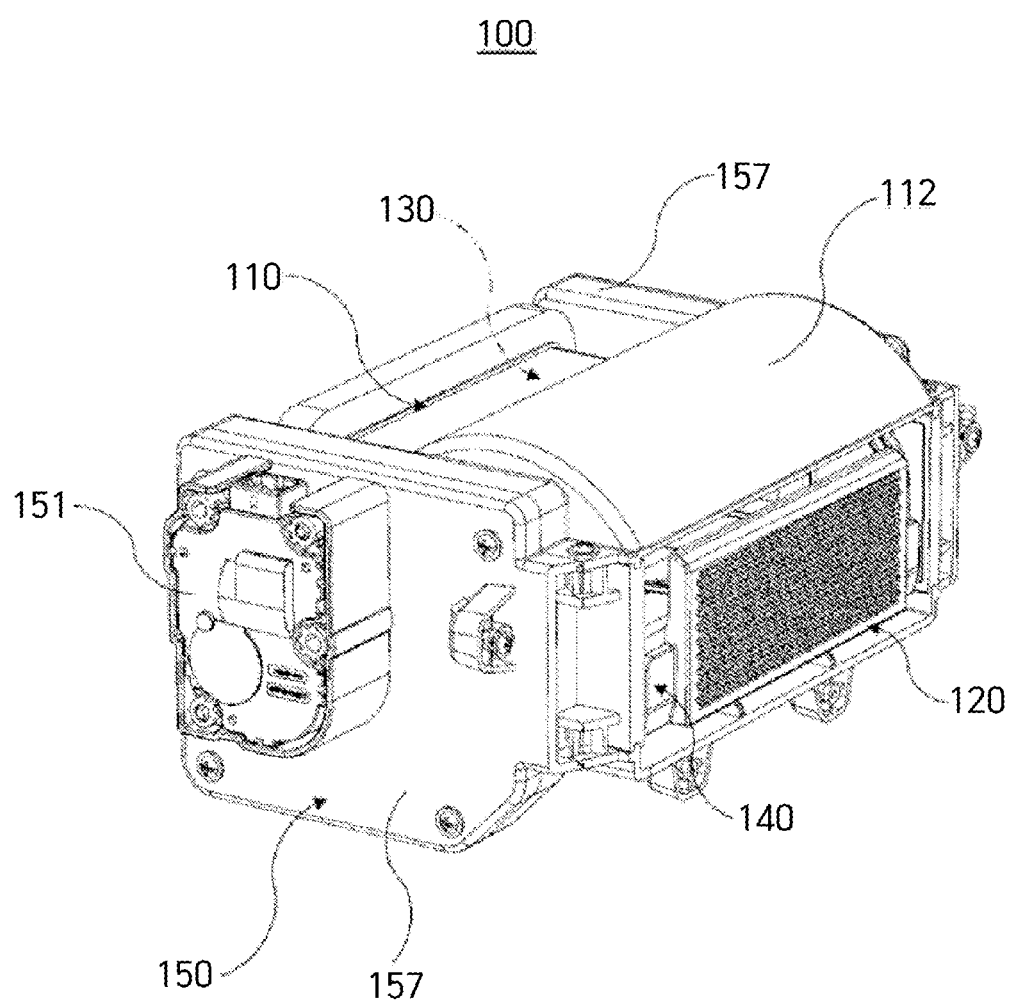
FIG. 5 is a partial front perspective view schematically illustrating the air vent of FIG. 1.

The vent unit 130 has a plurality of vertical adjustment wings 133, which are arranged on the vent hole 131a of the housing 131 and intersect with the left/right adjustment wings 132 (see FIG. 3). A knob 134 serves as a direction key of the left/right adjustment wings 132 (see FIG. 3) and the vertical adjustment wings 133.

When the user sets the direct wind mode, as illustrated in FIG. 9, the vent unit 130 is changed in position to be directed toward the outlet of the duct unit 110, and the cover unit 120 interlocked with the vent unit 130 is changed in position by upward tilting.

[Operating Process (Mechanical Mechanism)]

FIGS. 10 to 17 are views schematically illustrating an operating relationship between components in switching from the indirect wind mode to the direct wind mode in the vehicle air vent according to the embodiment of the present disclosure.

Referring to FIGS. 10 to 17, when the user sets the direct wind mode, the drive unit 150 changes the positions of the cover unit 120 and the vent unit 130. FIGS. 10 to 17 illustrate a state in which the actuator 151 is rotated at an angle of 0 degrees in FIG. 10, at an angle of 20 degrees in FIG. 11, at an angle of 40 degrees in FIG. 12, at an angle of 62 degrees in FIG. 13, at an angle of 85 degrees in FIG. 14, at an angle of 100 degrees in FIG. 15, at an angle of 125 degrees in FIG. 16, and at an angle of 148 degrees in FIG. 17. In this case, the cover unit 120 is rotated within a range of about 90 degrees, the angle of rotation of the side gear 154 is about 192.4 degrees, and the longitudinal movement distance of the vent unit 130 is about 40 mm. These preset specifications may be optimal conditions for preventing the cover unit 120 from colliding with an inner duct during rotation.

A series of processes related to the change in position of the vent unit 130 and the duct unit 120 will be described now.

First, the position of the vent unit 130 is changed in the following order.

Firstly, when the actuator 151 rotates in the forward direction, the main gear 152 interlocked with the actuator 151 also rotates in the forward direction. Secondly, the sub gear 153 interlocked with the toothed wheel 152d of the main gear 152 rotates in the reverse direction. Thirdly, the side gear 154 in engagement with the sub gear 153 rotates in the forward direction. Fourthly, the pinion gear 156 (see FIG. 7) connected to the connecting pin 155 (see FIG. 7) together with the side gear 154 engages the rack 131b (see FIG. 7) of the vent unit 130 to move the vent unit 130 rearward (toward the outlet of the duct unit 110).

Next, the position of the cover unit 120 is changed simultaneously in conjunction with the vent unit 130. In this case, the cover unit 120 is fastened to the link unit 140 interlocked with the drive unit 150. The link unit 140 transmits the driving force of the drive unit 150 to the cover unit 120, thereby enabling the cover unit 120 to be tilted by the drive unit 150.

The position of the cover unit 120 is changed in a series of processes as follows.

Firstly, when the main gear 152 rotates in the forward direction, the cam link 143 fitted into the guide hole 152b of the rotating cam 152a is directed downward by the inverted "L"-shaped end of the guide hole 152b. Secondly, when the cam link 143 is directed downward with respect to the axis of rotation of the cam link 143 rotatably connected to the spacer 111, the guide link 142 connected at a fixed angle to the cam link 143 is directed upward. Thirdly, the cover link 141 is also directed upward together with the guide link 142. In this case, the guide protrusion 141a of the cover link 141 rotates upward along the guide groove 111a formed inside the edge of the spacer 111. Fourthly, the cover unit 120 connected to the cover link 141 rotates upward about the axis of rotation of the cam link 143.

As described above, the positions of the cover unit 120 and the vent unit 130 are changed by interlocking. Accordingly, it is preferable that a series of processes according to the change in position of the cover unit 120 and the vent unit 130 proceed simultaneously.

Figure 18:
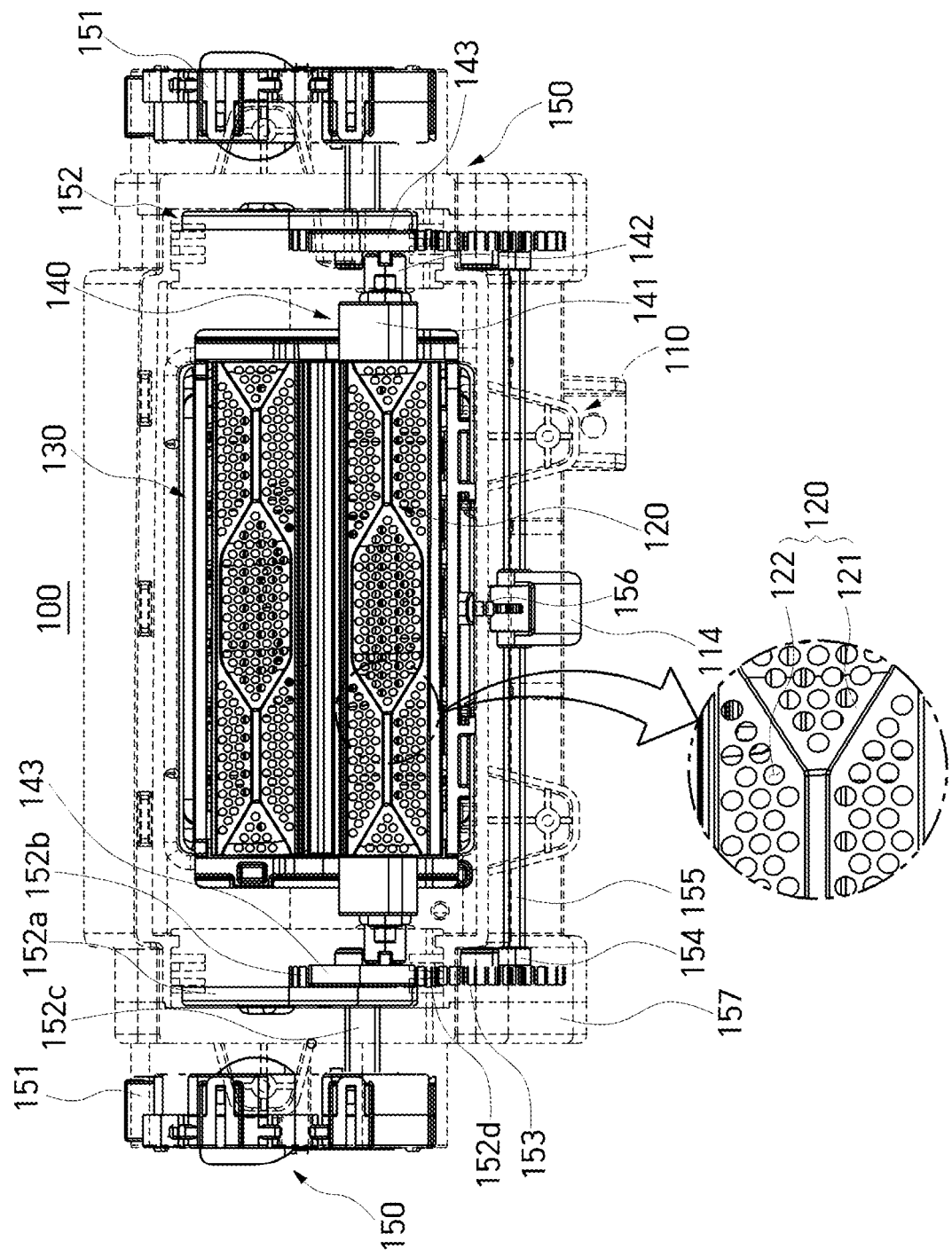
FIG. 18 is a front view schematically illustrating an example in which the air vent of FIG. 1 is set in the indirect wind mode.

FIG. 18 is a front view schematically illustrating an example in which the vehicle air vent is set in the indirect wind mode according to the embodiment of the present disclosure.

Referring to FIG. 18, the cover unit 120 includes a mesh plate 121 forming the body thereof and a plurality of mesh holes 122 formed at intervals in the mesh plate 121. The mesh holes 122 may communicate with the outlet of the duct unit 110.

The arrangement of the mesh holes 122 may adjust the direction of wind discharged into the vehicle. That is, the mesh holes 122 may be biased toward one side on the mesh plate 121 to induce the direction of wind. For example, the mesh holes 122 may be arranged in a circular or oblique form on the mesh plate 121.

The upper and lower ends of the mesh cover 120 are spaced apart from the outlet of the duct 110, so that the air flowing from the inlet of the duct unit 110 is bent along the top and bottom garnishes 10 and 20 (see FIG. 2) extending vertically at the outlet of the duct unit 110 and then flows into the vehicle.

In this case, the cover unit 120 may be made of the same material as the garnishes 10 and 20 (see FIG. 2) of the interior board of the vehicle adjacent to the outlet of the duct unit 110, thereby effectively inducing the Coanda effect in addition to the exterior design.

Figure 19:
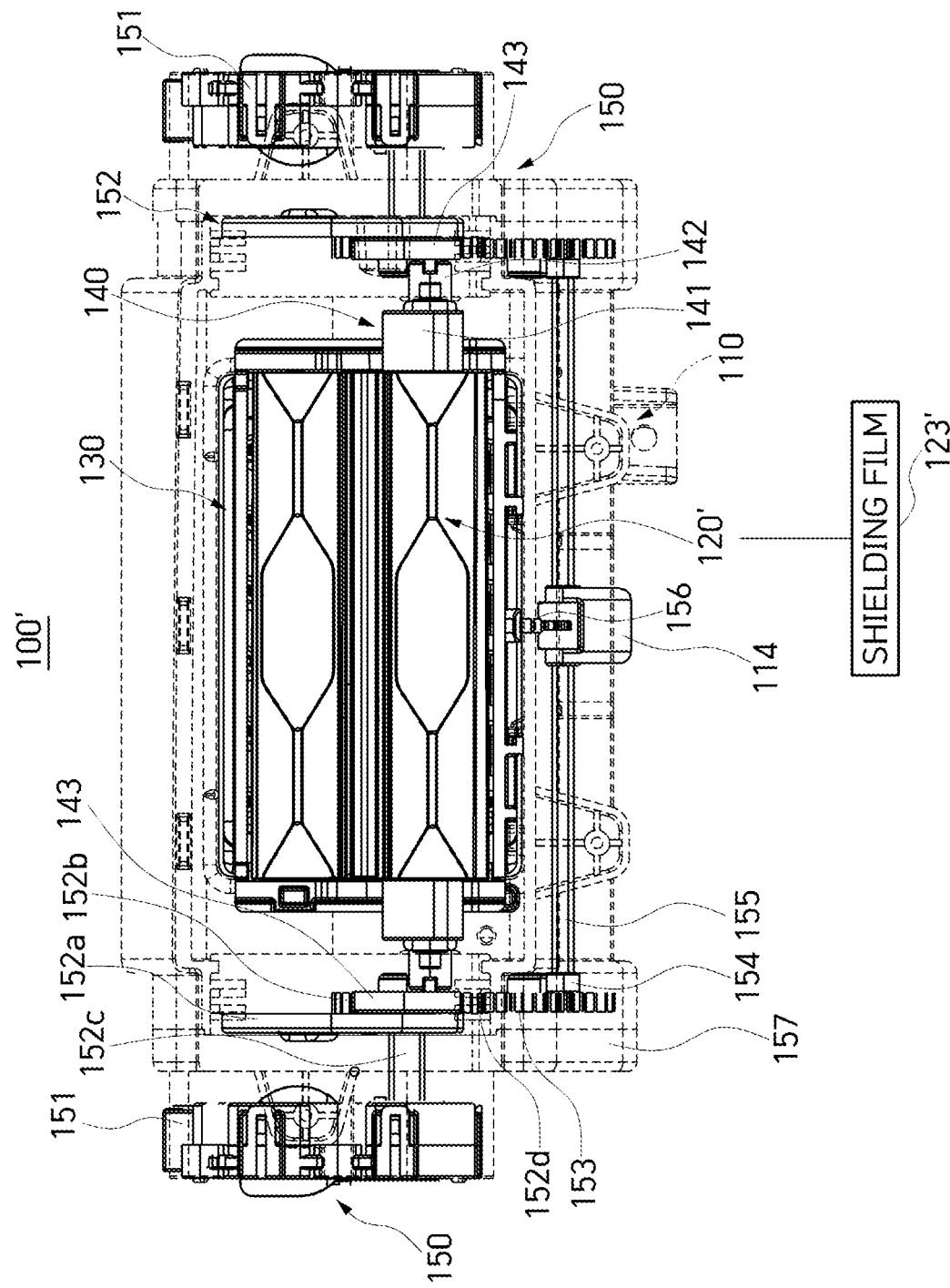
FIG. 19 is a front view schematically illustrating an example in which the air vent of FIG. 1 is set in a closed mode.

FIG. 19 is a front view schematically illustrating an example in which the vehicle air vent is set in a closed mode according to the embodiment of the present disclosure.

Referring to FIG. 19, when a cover unit 120' is changed in position to be directed toward the outlet of the duct unit 110, it is possible to selectively shield the outlet of the duct 110. In this case, the cover unit 120' may include a shielding film 123' capable of partially or wholly blocking the inflow of air toward the vehicle interior at both ends in the width direction.

As is apparent from the above description, according to the embodiment of the present disclosure, it is possible to increase the usability/functionality of the multifunctional air vent for direct and indirect wind and to prevent the misuse and failure of the air vent.

In addition, according to the embodiment of the present disclosure, the vehicle air vent can have improved air conditioning performance and is applicable to a next-generation slim cockpit design.

Furthermore, it is possible to effectively implement direct and indirect wind (including dead calm) suitable for users, and to implement a simple design in harmony with surrounding garnishes in the indirect wind mode.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although the present disclosure has been described in detail with respect to the embodiments illustrated in the accompanying drawings, such embodiments are provided by way of example only. It will be understood by those skilled in the art that various modifications and variations may be made without departing from the spirit and scope of the disclosure as defined in the following claims. Therefore, the scope of protection of the present disclosure should not be limited to the above-mentioned embodiments and should be defined by the disclosure as defined in the appended claims.

What is claimed is:

1. A system for controlling direct and indirect multifunctional air vents, comprising:
    an air vent mounted inside a dashboard in an interior of a vehicle, and configured to guide air flowing from a vehicle air conditioner to the interior of the vehicle and to switch a mode of the air vent to a direct wind mode or an indirect wind mode;
    a vehicle state detector configured to detect a vehicle state for changing a mode of the air vent; and
    a controller configured to control the air vent to change the mode thereof in response to the vehicle state detected by the vehicle state detector,
    wherein, when the vehicle state detector detects that the vehicle is in an OFF state, the controller controls the air vent to enter the indirect wind mode in which a duct unit is blocked at the front thereof by a cover unit so that wind is not provided directly to a user from the air conditioner.

2. The system according to claim 1, wherein the controller switches or maintains the mode of the air vent after maintaining a blowing mode using the air conditioner for a preset time before it is detected that the vehicle is in the OFF state so that the mode of the air vent is maintained or switched to the indirect wind mode.

3. The system according to claim 2, wherein, when it is detected that the vehicle is in the OFF state, the controller stores, in a storage unit, mode information before the mode of the air vent is maintained or switched to the indirect wind mode.

4. The system according to claim 2, wherein, when it is detected that the vehicle is switched from the OFF state to an ON state, the controller controls the air vent in the air vent mode stored in the storage unit.

5. The system according to claim 4, wherein, when it is detected that the vehicle is switched from the OFF state to the ON state, the controller controls the air vent to enter the direct wind mode.

6. The system according to claim 1, wherein the controller determines whether the air conditioner is operated while the vehicle is traveling, so that the controller controls the air vent to operate in the direct wind mode when the air conditioner is in operation and controls the air vent to operate in the indirect wind mode when the air conditioner is not in operation.

7. The system according to claim 1, wherein, when the air conditioner is set to operate automatically based on a set temperature, the controller is configured to:
    control the air vent to operate in the direct wind mode when the temperature in the vehicle does not reach a preset temperature; and
    control the air vent to operate in the indirect wind mode when the temperature in the vehicle reaches the preset temperature.

8. The system according to claim 1, wherein, when an event such as external force or foreign substance penetration is detected in switching the mode of the air vent, the controller controls the air vent to stop a mode switching operation thereof and return to a previous mode.

9. A system for controlling direct and indirect multifunctional air vents, comprising:
    an air vent mounted inside a dashboard in an interior of a vehicle, and configured to guide air flowing from a vehicle air conditioner to the interior of the vehicle and to switch a mode of the air vent to a direct wind mode or an indirect wind mode;
    a vehicle state detector configured to detect a vehicle state for changing a mode of the air vent; and
    a controller configured to control the air vent to change the mode thereof in response to the vehicle state detected by the vehicle state detector,
    wherein, when the vehicle state detector detects that the vehicle is switched from an OFF state to an ON state, the controller controls the air vent so that the mode thereof is switched to the indirect wind mode, the direct wind mode, and the indirect wind mode in a sequential manner for setting an initial position of an actuator of the air vent.

10. The system according to claim 9, wherein, when a welcome function operation is detected before the vehicle is started, the controller controls the air vent to perform an operation for setting the initial position of the actuator of the air vent.

* * * * *